March 9, 1965
J. A. DEWAR
3,172,377
BOMB SHELTER BUILDING
Filed April 6, 1961
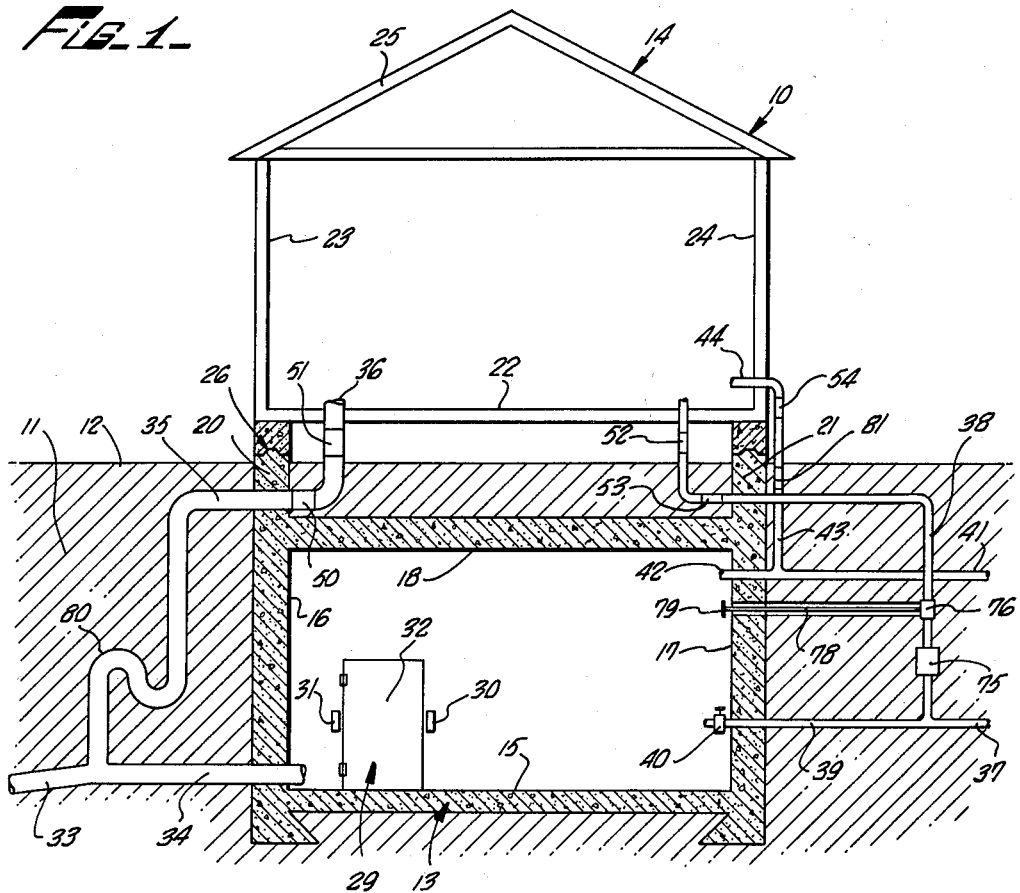
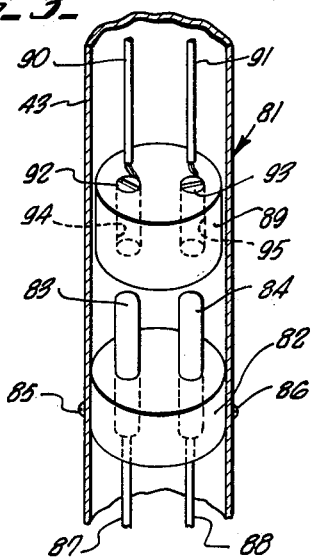
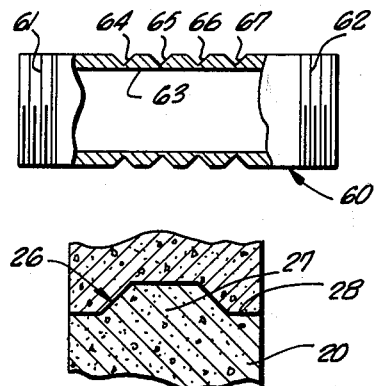
INVENTOR.
JOHN A. DEWAR
BY
ATTORNEYS.

3,172,377
BOMB SHELTER BUILDING
John A. Dewar, 154 Santa Anita Court,
Sierra Madre, Calif.
Filed Apr. 6, 1961, Ser. No. 101,281
1 Claim. (Cl. 109—1)

The invention relates to method and structure for providing a bomb shelter building of the type wherein the building includes a bomb shelter portion disposed below ground level and a disposable portion disposed above ground level with the shelter portion and the disposable portion united in a single building for unitary use during ordinary circumstances but with the shelter portion capable of separate use independently of the disposable portion in case of destruction of the disposable portion.

Conventional subsurface bomb shelters are often a separate structure from the surface structure to which they are appurtenant. This means that the bomb shelter lies idle most of the time and may never be used. The consequent waste of the capital invested in the bomb shelter is apparent. The invention obviates this disadvantage by providing a bomb shelter building wherein the entire building is completely usable in ordinary circumstances but in which a bomb shelter portion of the building is located below ground level and is related to the remainder of the building extending above ground so that, although the shelter portion and the remainder of the building are usable as a single building under ordinary circumstances, the shelter portion of the building may be used entirely independently of the remainder of the building, which is disposable. Consequently, in case of emergency, adequate shelter is provided within the shelter portion of the building irrespective of destruction of the remainder of the building.

The invention consists, broadly, of a method for constructing a bomb shelter building comprising the steps of locating a bomb shelter portion of the building below ground level, locating a disposable portion of the building above ground level and on the bomb shelter portion of the building as a foundation, and locating joints between the bomb shelter portion of the building and the disposable portion of the building adjacent to ground level which are readily rupturable so that the disposable portion of the building may be destroyed without impairing the integrity of the bomb shelter portion of the building. The inventive method also includes the steps of locating power, water, waste and other necessary utilities to serve both the disposable portion of the building and the shelter portion of the building and locating readily rupturable joints and connections therein adjacent to ground level so that destruction of the disposable portion of the building and the various utilities serving same will not impair the service thereof to the shelter portion of the building.

The invention also includes particular structure for a bomb shelter building which comprises, broadly, a shelter portion of the building disposed below ground level and having walls and a roof defining habitable space within the shelter portion and with the walls and roof of the shelter portion reinforced to withstand severe blast, shock, and heat, a disposable portion of the building constructed above ground level and having a floor, roof, and walls defining habitable living space with the disposable portion and shelter portion being jointly habitable and independently habitable and with the disposable portion being built upon the shelter portion as foundation. Breakaway shear joints key and connect the disposable portion of the building to the shelter portion of the building so that the disposable portion of the building is readily severable from the shelter portion of the building in case of destruction of the disposable portion of the building without impairment of the shelter portion of the building.

The invention will be fully understood from a reading of the following description in conjunction with the accompanying drawings, in which:

FIG. 1 is a schematic elevational view of an embodiment of the inventive structure;

FIG. 2 is a schematic sectional view to enlarged scale of an embodiment of a portion of the inventive structure;

FIG. 3 is a fragmentary perspective view to enlarged scale of an embodiment of a portion of the inventive structure; and FIG. 4 is a fragmentary view to enlarged scale of an embodiment of a portion of the inventive structure.

The inventive method for constructing a bomb shelter building comprises the following steps: first, locating a heavily constructed blast, shock and heat resistant shelter portion of the building below ground level. The shelter portion of the building is habitable and usable in ordinary use of the remainder of the building and for all ordinary purposes is a part of the building proper. Second, locating a conventionally constructed disposable portion of the building above ground level and on the shelter portion of the building as foundation. The disposable portion of the building constitutes the remainder of the building which is not part of the shelter portion thereof and is constructed in any desired conventional manner. Since the disposable and shelter portions of the building are for all ordinary purposes parts of a single unitary building, the disposable portion of the building is built on the shelter portion of the building as foundation to unitize the two for ordinary purposes. Third, locating readily rupturable joints between the disposable portion of the building and the shelter portion of the building at approximately ground level so that destruction of the disposable portion of the building does not impair structural integrity of the shelter portion of the building. These joints are incorporated into the building as it is built and for all ordinary purposes join the shelter portion of the building to the disposable portion of the building as a single building. However, the joints readily rupture upon destruction of the disposable portion of the building so that upon the event which destroys the disposable portion of the building, the shelter portion of the building is left structurally unimpaired. Fourth, locating separate and independent power, water, waste and other necessary utilities, which may include telephone service and gas service, to serve the disposable portion of the building and to serve the shelter portion of the building from a common source. This step constitutes designing the utilities so that, although they serve from a common source, they are separate systems in the shelter and disposable portions of the building. Fifth, locating readily rupturable joints in the power, water, waste and other utilities serving the disposable portion of the building at approximately ground level. These joints operate to sever the utilities in the disposable portion of the building from the utilities in the shelter portion of the building upon the event of destruction of the disposable portion of the building. The joints are located at approximately ground level to facilitate this severing function. Sixth, locating means below ground level in the utilities serving the disposable portion of the building to shut off service of such utilities to the disposable portion of the building. This step is provided so that, upon destruction and severance of the utilities serving the disposable portion of the building, there will be no impairment of the service of the utilities serving the shelter portion of the building. The means are located below ground level so that they will not be affected nor impaired in their operation as a result of the event which destroys the surface structures. As a consequence of the above method, a bomb shelter building is provided which includes a shelter portion normally unitized with the remainder of the building so that the shelter portion and the remainder of the building cooperate together as a single building during ordinary use. The same applies to the various utilities supplied to the building. Upon occurrence of an event which destroys the surface structures, the various joints provided at the above locations cooperate with each other and with the destructive event to sever the shelter portion of the building with its utilities from the remainder of the building without impairment of the structural integrity of, nor utility service to, the shelter portion of the building. It is apparent that the above method may be practiced with many vastly different structures and is relatively independent of the specific structure involved.

An illustrative embodiment of a structure in practice of the method is shown in the drawings. Referring to FIG. 1, 10 indicates a bomb shelter building constructed according to the invention. The ground is denoted with the reference numeral 11, and 12 is the ground surface. as shown in FIG. 1, building 10 consists of a shelter portion 13 and a disposable portion 14.

Shelter portion 13 of building 10 has a floor 15, walls 16, 17, and roof 18, all disposed below ground level 12 for protection from heat, blast and shock. End walls (not shown) similar to walls 16, 17 extend between walls 16 and 17. Shelter portion 13 is heavily reinforced, particularly in its walls and roof 18, in conventional manner, such as thick concrete slabs heavily reinforced with steel, to withstand severe heat, blast and shock. Shelter portion 13 defines completely habitable and usable space within its walls, floor and roof so that it is fully usable under all ordinary circumstances.

Shelter portion 13 has foundation portions 20 and 21 which extend upwardly from roof 18 to about ground level 12. As illustrated in FIG. 1, foundation portions 20 and 21 are upward extensions of walls 16 and 17, but in other embodiments this need not be the case. Disposable portion 14 of the building includes a floor 22, walls 23, 24, and roof 25 and, as illustrated in FIG. 1, is built upon foundation portions 20, 21 of shelter portion 13. A shear breakaway joint indicated at 26 extends the full length of foundation portions 20, 21 and serves to connect disposable portion 14 to shelter portion 13 with a connection which keys the two portions together but which is readily breakable so that destruction of disposable portion 14 will result in a clean break from shelter portion 13 at such joints. Referring to FIG. 4, the shear breakaway joint is shown in greater detail and includes a projection 27 which mates in a recess and keys together the upper and lower portions of foundation portion 20 so that under normal circumstances there is no lateral displacement therebetween. A membrane 28 is disposed between the upper and lower portions of foundation portion 20 so that there is no actual bonding therebetween. This membrane may be any conventional material used for such purpose as is well known in the construction industry and, for example, may be a layer of paper, a plastic sheet, or, as preferred, a plastic spray which is sprayed upon the exposed surface of the lower portion of foundation portion 20 prior to construction of the upper portion thereof to prevent any actual bonding between the two portions. It is apparent that shear breakaway joint 26 may take various other particular forms well known in the construction industry. Disposable portion 14 defines completely habitable and usable living space and is connected with the space in shelter portion 13 by means of a conventional downwardly extending stairway (not shown) which extends to shelter portion 13 and communicates therewith through schematically illustrated doorway 29. With this arrangement, the habitable space in the disposable and shelter portions are unitized for ordinary purposes and are used as a single unit. Doorway 29 includes door 32 and brackets 30, 31 in which a holding bar (not shown) may be disposed to securely close and bar door 32 against blast and shock when it is necessary to use the shelter portion for purposes of shelter.

Conduit means is provided for supplying power, water, and waste service to the disposable portion and to the shelter portion of the building from a common source. As shown in FIG. 1, waste service is effected through conduit 33 which has branch 34 extending to and serving shelter portion 13 and branch 35 extending to and serving disposable portion 14 at 36. A water conduit 37 has a branch 38 providing water service to disposable portion 14 and a branch 39 providing water service to shelter portion 13. A conventional valve 40 is disposed in branch 39 of water conduit 37 within shelter portion 13. Electrical power conduit 41 has a branch 42 supplying electrical power to shelter portion 13 and a branch 43 supplying electrical power to disposable portion 14 at 44. Similar arrangements may be provided for natural gas service, telephone service and other necessary utilities.

Branch 35 of waste conduit 33 has frangible couplings 50, 51 disposed in it outside of shelter portion 13 and adjacent to ground level 12, with joint 51 being located just above ground level and joint 50 being located slightly below ground level. Similar frangible joints 52, 53 are disposed in branch 38 of water conduit 37 in the same locations relative to ground level as described above for joints 50, 51 in branch 35 of waste conduit 33. A frangible joint 54 is provided in branch 43 of power conduit 41 slightly above ground level and outside of shelter portion 13. These frangible joints are designed to function as a normal conduit under all usual circumstances but are suitably weakened so that they readily break upon forces applied thereto as a result of severe shock or blast. The frangible joints may take various forms, one typical embodiment of which is illustrated in FIG. 2. Referring to FIG. 2, nipple 60 has threads 61 on one end and threads 62 on the other end so that it can be connected to the conduit in which it is interposed. Nipple 60 defines a flow passage 63 extending therethrough and in its exterior surface has a plurality of weakened portions 64, 65, 66 and 67 which do not impair its performance under ordinary service but readily rupture and cause nipple 60 to break upon application of severe stress thereto such as would be present from an explosion or the like. All of the joints 50, 51, 52, 53, and 54 may be generally similar to nipple 60 or may, in other manner, be readily rupturable to effect the above described function and purpose.

Shut-off means is disposed in the various utility conduits below ground level in the branch serving the disposable portion of the building for shutting off service to the disposable portion and isolating the branch serving the disposable portion of the building from the branch serving the shelter portion of the building and the common source of the service. Referring to FIG. 1, the shut-off means in branch 38 of water conduit 37 may comprise a ball valve 75 of conventional construction so that upon loss of pressure upstream from ball valve 75 it automatically shuts off further flow of water thereto. It is apparent that other conventional self-actuating shut-off valves may be substituted for ball valve 75. In addition to ball valve 75, a manually operable valve 76 is provided which has an operating shaft 78 extending to the interior of shelter portion 13 with a handle 79. Through manipulation of control shaft 78, valve 76 may be actuated to shut off branch 38 supplying water service to the disposable portion 14, this being a safety factor in case of failure of ball valve 75. In waste conduit 33 the shut-off means comprises a trap 80 which serves to isolate branch 35 of such conduit from branch 34 and from conduit 33 so that upon destruction of branch 35 at and above ground level 12, trap 80 seals off the remainder of branch 35 from waste conduit 33 and branch 34 thereof.

It is apparent that other conventional means may be provided in branch 35 of waste conduit 33 to effect the above described function and purposes of trap 80. Referring to branch 43 of power conduit 41, a plug structure 81 is disposed adjacent to frangible coupling 54 and slightly below ground level to protect it from damage due to an explosion. Referring to FIG. 3, the plug 81 is shown in detail schematically and, as illustrated, a male portion 82 having prongs 83 and 84 is disposed within branch 43 in fixed position by means of screws or rivets 85, 86. Electrical power leads 87, 88 from the source of power are electrically connected to electrically conductive prongs 83, 84. A female socket 89 is movably disposed within branch 43 of power conduit 41 and has electrical leads 90 and 91 connected thereto by means of screws 92, 93. Female socket 89 defines electrically conductive recesses 94, 95 which are electrically connected to leads 90, 91 and which mate with and engage prongs 83, 84 in conventional manner so that when socket 89 is disposed with its recesses 94, 95 over prongs 83, 84 electrical contact is effected therebetween and electrical leads 87, 88 are connected to electrical leads 90, 91 to transmit electrical energy. When a blast occurs so as to rupture frangible joint 54, there is displacement of branch conduit 43 and the electrical leads within such conduit at and above ground level, and this results in movement of socket 89 away from plug 82 and disengagement of prongs 83, 84 from recesses 94, 95, as illustrated in FIG. 3, thereby disconnecting electrical power service to the disposable portion 14 of the building. It is apparent that other arrangements may be utilized in branch conduit 43 to effect the function and purposes of the structure shown in FIG. 3 and described above. In similar manner as the above described services, gas and telephone service may be supplied to shelter portion 13 and disposable portion 14.

It is thus apparent that the above described frangible joints and shut-off means cooperate with each other and with shelter portion 13 to shut off service to disposable portion 14 responsive to a destructive event and to isolate as a separate, operable system the service of utilities to shelter portion 13 without impairment thereof.

I claim:

A bomb shelter building comprising a shelter portion of the building having a floor, walls, and roof defining a habitable and usable space, said floor, walls and roof of the shelter portion being disposed below ground level, means incorporated in the walls and roof of the shelter portion for reinforcing such walls and roof to withstand severe heat, blast, and shock, a disposable portion of the building disposed on and supported by the shelter portion of the building and extending above ground level, the disposable portion of the building having a peripheral foundation engaged with the shelter portion of the building including a laterally severable shear breakaway connection disposed at approximately ground level between the disposable portion of the building and the shelter portion of the building, said connection comprising an interface between the shelter portion of the building and the foundation of the disposable portion of the building having a keying projection on one face of the interface mating with a receiving recess in the other face of the interface so that the shelter portion of the building and the disposable portion of the building are unitized for joint use during normal conditions but destruction during a condition of disaster of the disposable portion of the building results in a clean break with the shelter portion of the building, conduit means for supplying power, water, and waste service separately to the disposable portion of the building and to the shelter portion of the building from a common source of service exteriorly of the shelter portion of the building, frangible coupling means disposed at approximately ground level in the conduit means for causing rupture of the conduit means supplying service to the disposable portion of the building responsive to destruction of the disposable portion of the building without impairing the conduit means serving the shelter portion of the building, and shut-off means disposed in the conduit means serving the disposable portion of the building below ground level and intermediate the frangible coupling means therein and the common source of service for shutting off service to the disposable portion of the building without interruption of service to the shelter portion of the building.

References Cited in the file of this patent

UNITED STATES PATENTS

| 310,490 | Atwood et al. | Jan. 6, 1885 |
| 2,212,757 | Stout | Aug. 27, 1940 |
| 2,690,074 | Jones | Sept. 28, 1954 |
| 2,715,756 | Carver | Aug. 23, 1955 |
| 2,931,382 | Cirillo | Apr. 5, 1960 |

FOREIGN PATENTS

| 860,202 | France | Sept. 24, 1940 |
| 258,792 | Switzerland | May 16, 1949 |
| 1,005,873 | France | Jan. 2, 1952 |
| 157,748 | Sweden | Feb. 5, 1957 |

OTHER REFERENCES

"Architectural Forum," January 1942, pp. 36, 37, 43.
"American Builder," May 1959, page 212.
"Clay Masonry Family Fallout Shelters," MP–18, February 1960, pp. 7–13, Office of Civil and Defense Mobilization.